Sept. 27, 1966 F. ROSENBUSCH 3,275,948
INVERTER WITH D.C. FREQUENCY CONTROL
Filed March 9, 1964 3 Sheets-Sheet 1
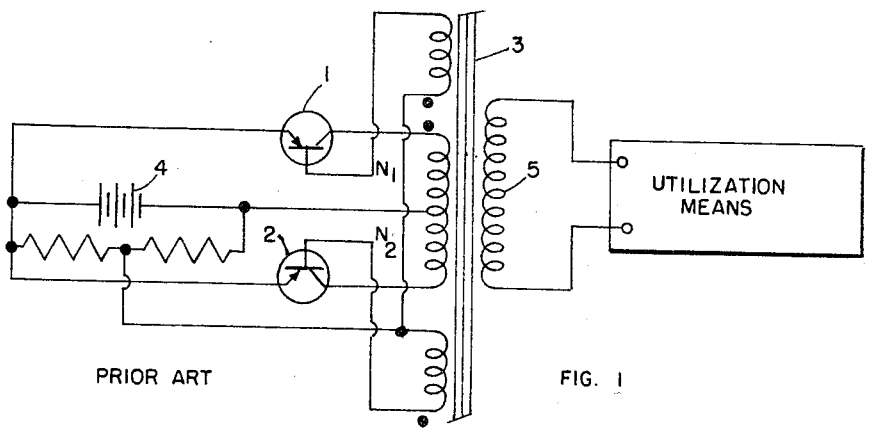
PRIOR ART FIG. 1
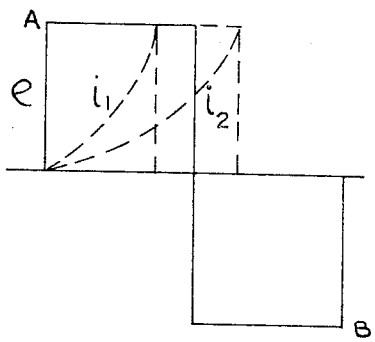
FIG. 2
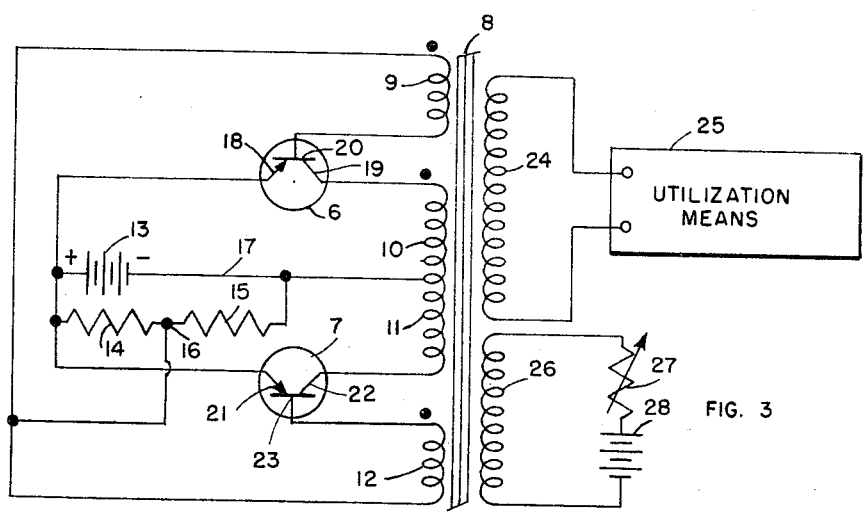
FIG. 3
INVENTOR.
FRANKLIN ROSENBUSCH
BY
*Alfred W. Barber*
ATTORNEY INVENTOR.
FRANKLIN ROSENBUSCH
BY
*Alfred W. Barber*
ATTORNEY

United States Patent Office 3,275,948
Patented Sept. 27, 1966

3,275,948
INVERTER WITH D.C. FREQUENCY CONTROL
Franklin Rosenbusch, Lake Hiawatha, N.J., assignor to Forbro Design Corp., New York, N.Y., a corporation of New York
Filed Mar. 9, 1964, Ser. No. 350,243
4 Claims. (Cl. 331—113)

The present invention concerns D.C. to A.C. inverters and, in particular, methods of and means for controlling the frequency and wave-form of such inverters.

The D.C. to A.C. inverter to which the present invention pertains essentially consists of; a source of D.C. to be converted to A.C.; a pair of amplifying electronic devices such as transistors; and a multiple winding push-pull type transformer. The amplifying devices are connected as a push-pull feed-back oscillator utilizing the windings of the transformer so that an oscillating flux is developed in the transformer core. An additional winding coupled to the core provides an output voltage to whatever utilization means is to be supplied with A.C. The frequency of the converted A.C. is largely determined by the constants of the magnetic circuit provided by the transformer and the rate at which current is supplied from the battery to the transformer windings by way of the electronic amplifying devices. The current thus supplied alternately saturates the transformer core first in one direction and then in the other so that the output wave-form is substantially a square wave.

In the past it has been usual to consider the inverter as a constant frequency device although it has been known that some frequency adjustment can be made as by changing the D.C. voltage or the bias on the amplifying devices. Also, a capacitor across the windings of the transformer can be used to change the frequency but this may seriously affect the efficiency of the system and, in the case of transistors, cause overheating of the amplifying devices.

It has been found, in accordance with the present invention, that the frequency of the A.C. can not only be varied but can be varied over a wide range by controlling the saturation of the inverter transformer. A simple and ecective method of varying the saturation and hence the frequency of oscillation of the inverter system has been found to be the application of a controllable D.C. bias flux to the transformer core. It has also been found that by utilizing two transformers, one for each amplifying device, and by applying separate D.C. bias flux to the two transformers, that pulses of variable duration and variable repetition rate can be produced in a winding coupled to both transformers.

Accordingly one object of the present invention is to provide a D.C. to A.C. inverter characterized by a wide range of output frequency.

Another object is to provide a simple and inexpensive method of and means for controlling the frequency of the A.C. from a D.C. to A.C. inverter.

A further object is to provide a method of and means for producing variable repetition rate and variable pulse width output from a D.C. to A.C. converter.

These and other objects will be apparent from the detailed description of the invention given in connection with the various figures of the drawing.

In the drawing:

FIG. 1 is a schematic circuit diagram of the prior art form of D.C. to A.C. inverter.

FIG. 2 is a voltage/current wave form representation of the basic operation of a D.C. to A.C. inverter.

FIG. 3 is a schematic circuit diagram of one form of the present invention.

Figure 6:
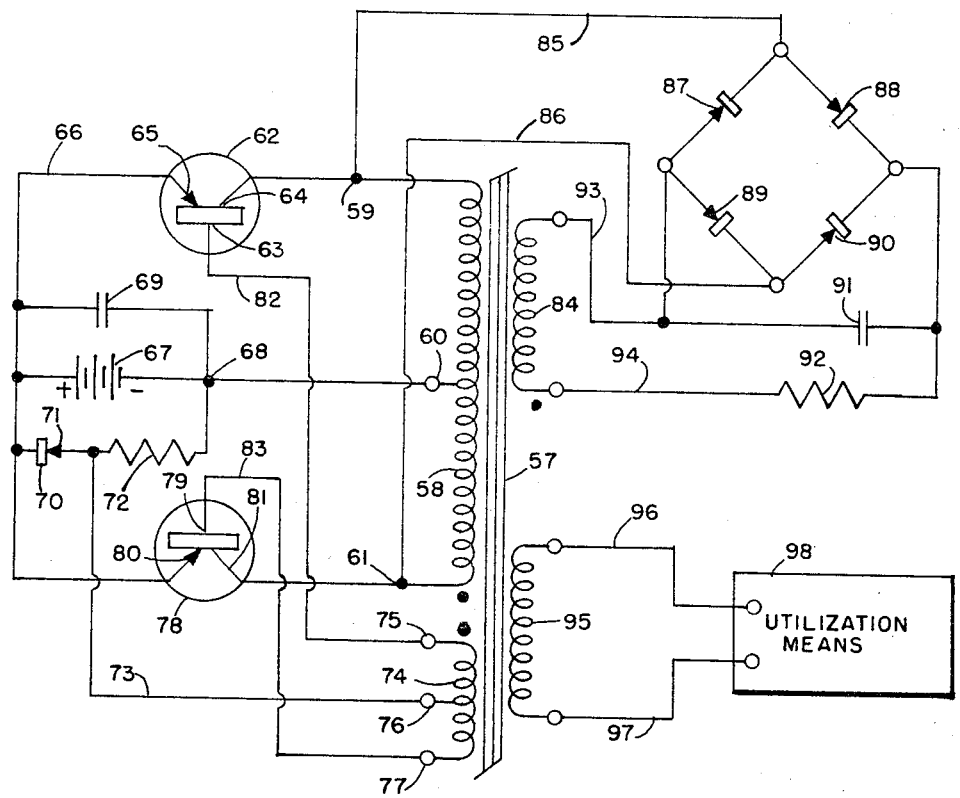

FIG. 6 in a schematic circuit diagram of a frequency control circuit in accordance with the present invention.

The prior art D.C. to A.C. inverter shown in FIG. 1 includes a pair of transistors 1 and 2 connected in a feed-back push-pull circuit by means of transformer 3, receiving D.C. power from battery 4 or other suitable D.C. source and supplying A.C. power to a utilization means 5. This circuit is a push-pull oscillator which, in effect, takes D.C. power from battery 4 or other suitable D.C. source and converts it to A.C. power for delivery to a utilization means connected across winding 5. The frequency of oscillation depends on the magnetic circuit and the rate at which current builds up through the transformer windings to produce saturation. FIG. 2 illustrates how a current $i_1$ builds up faster in a coil of low inductance than a current $i_2$ in a coil of higher inductance. Saturation levels A and B are assumed to be the same for either. Thus, the prior art circuit generates an output A.C. having a frequency which may be changed by changing the inductance of the coil windings or the point at which it saturates or the rate of current change may be varied by varying the voltage or bias on the transistors.

FIG. 3 is a circuit of a D.C. to A.C. converter in which the frequency can readily be changed over a wide frequency by controlling the inductance of the oscillation transformer. The oscillation transformer 8 carries windings 9, 10, 11, 12, 24 and 26. Transistors 6 and 7 are connected to these windings to form a push-pull oscillator. Transistor 6 includes base 20 connected to feed-back winding 9, collector 19 connected to tank winding 10 and emitter 18 returned to the positive side of the D.C. source 13. Base bias is supplied from tap 16 on the bias divider resistor 14–15 connected across D.C. source 13. In the same manner transistor 7 includes base 23 connected to feed-back winding 12 and receiving bias from tap 16, collector 22 connected to tank winding 11 and emitter 21 returned to the positive side of D.C. source 13. D.C. voltage is supplied to collectors 19 and 22 over lead 17 and through coils 10 and 11 respectively. A.C. power is taken from the system by means of winding 24 which feeds the utilization means 25. The inductance of the various windings of transformer is varied to change the frequency of oscillation of the push-pull oscillators and hence the frequency of the A.C. power output by varying the saturation of the transformer core. A convenient method of doing this is to vary the D.C. current in winding 26 by means of control variable resistor 27 connected in series with a suitable source of D.C. such as battery 28 and across winding 26. Since the windings are separate, the D.C. sources 13 and 28 may be a common single battery. In a practical circuit it has been found possible to change the frequency in this way over a range of several octaves.

Figure 5:
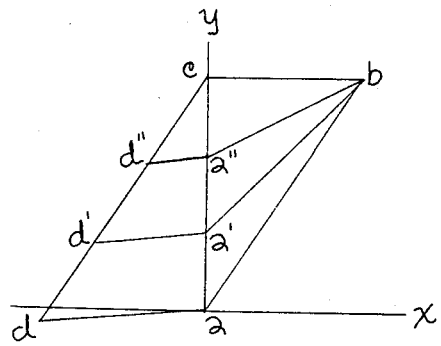
FIG. 5 is a series of hysteresis loops representing the mode of operation of the present invention.

FIG. 5 illustrates by means of a series of hysteresis loops how the controlled D.C. affects the saturation of the transformer core. As the D.C. bias is increased saturation takes place in a shorter time producing an ever smaller loop and a higher frequency of the resulting A.C.

Figure 4:
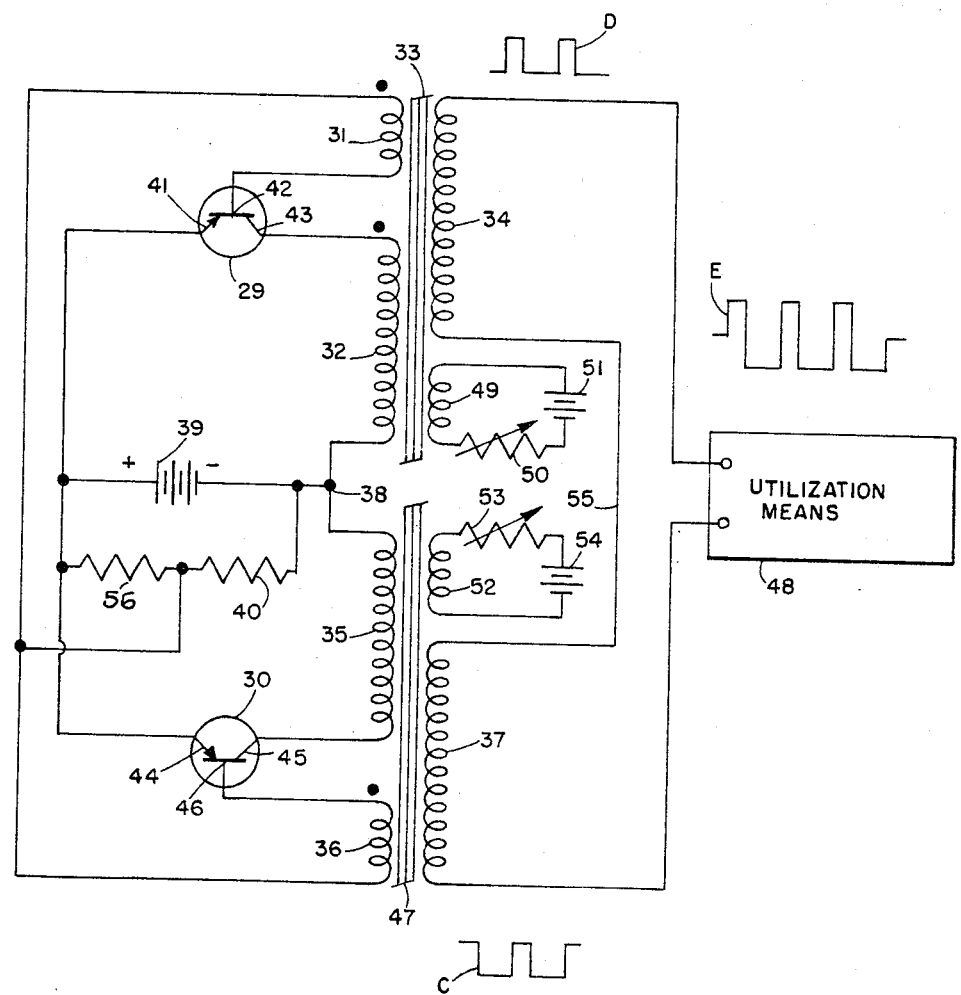
FIG. 4 is a schematic circuit diagram of a modified form of the present invention.

FIG. 4 shows a D.C. to A.C. inverter utilizing two transformers and capable of yielding pulses of variable duration and repetition rate. One transformer including core 33 and windings 31, 32, 34 and 49 is connected to transistor 29 in an oscillatory feed-back circuit. Emitter 41 is connected to the positive side of the D.C. source 39, collector 43 is connected to transformer winding 32 which is returned to point 38 and the negative side of D.C. source 39, and base 42 is connected to feed-back winding 31 which is returned to a suitable bias tap point on resistor 40. The second transformer including core 47 and windings 35, 36, 37 and 52 is connected to transistor 30 in an oscillatory feed-back circuit. Emitter 44 is connected to the positive side of the D.C. source 39, collector 45 is connected to transformer winding 35 which is returned to point 38 and the negative side of D.C. source 39, and base 46 is connected to feed-back winding 36 which is returned to the bias tap point on resistor 40. Winding 49 is provided to control the saturation in core 33 by means of a suitable controlled source of current such as that provided by battery 51 and variable resistor 50. Thus the frequency of oscillation of transistor 29 is controlled resulting in controlled pulses such as those shown at D. In a similar manner controlled current is passed through winding 52 from battery 54 controlled by variable resistor 53 and varying the saturation in core 47. Thus the frequency of oscillation of transistor 30 is controlled resulting in a second pulse rate such as those shown at C. The pulses from the two transformers are combined in windings 34 and 37 coupled to cores 33 and 47 respectively and feeding utilization means 48 with the combined pulse wave as, for example, E exhibiting a pulse form of variable pulse width and variable repetition rate.

In FIG. 5 is shown a series of hysteresis loops characteristic of the operation of the present invention. As the current in the control circuit is increased, the operating loop becomes smaller and the resulting frequency becomes higher.

FIG. 6 is the circuit of a modified form of the present invention in which the variable saturation of the inverter core is utilized to stabilize rather than to vary the frequency. The inverter transformer includes a saturable core 57, a main oscillator winding 58, an oscillator feedback winding 74, a stabilizing feed-back control winding 84 and an output winding 95. The power oscillator transistors 62 and 78 operate to convert direct current power from a suitable source such as battery 67 into alternating current power to be supplied a utilization means 98. Collector 64 is connected to end terminal 59 of winding 58 while collector 81 is connected to the other end terminal 61. Emitters 65 and 80 are connected together over lead 66 to the positive end of direct current source 67. Base 63 is connected over lead 82 to one end 75 of feed-back winding 74 while base 79 is connected over lead 83 to the other end 77. Center tap 60 is connected to the negative end of direct current source 67. Operating bias for the transistor bases is provided from point 68 through resistor 72 and over lead 73 to center tap 76. Diode 70–71 is connected from resistor 72 to positive line 66. Direct current source 67 is by-passed by capacitor 69. Thus there has been shown and described a transistor oscillator suitable for operation as an inverter.

Alternating current output power is derived from a suitable winding 95 on core 57 and connected to utilization means 98 over leads 96–97.

The frequency stabilization in accordance with the present invention is accomplished by deriving an alternating current signal from the oscillator as by means of leads 85 and 86 connected between terminals 59 and 61 and one diagonal of a rectifier bridge made up of rectifiers 87, 88, 89 and 90. The rectified output taken across the other diagonal of the bridge is applied to filter capacitor 91 thereby providing a direct current voltage which is proportional to the amplitude of the inverter oscillator. A variable saturating current is provided from this voltage by applying it to coil 84 coupled to core 57 over leads 93 and 94 and controlled or adjusted to a suitable value by current limiting series resistor 92. The connections are made in such a direction so that a tendency for the frequency of the inverter oscillator to increase produces a saturating current in coil 84 tending to decrease the inverter frequency. The operation is thus actually a degenerative feed-back system and has been found to stabilize inverter frequency by over an order of magnitude.

While only a few forms of the present invention have been shown and described, many modifications will be apparent to those skilled in the art and within the spirit and scope of the invention as set forth in particular in the appended claims.

What is claimed is:

1. In a direct current to alternating current inverter, the combination of, a saturable core, a source of direct current, a main winding on said core, a feed-back winding on said core, a pair of transistors connected to couple said source of direct current with said windings adapted to provide an oscillating circuit, a third winding coupled to said core for providing an output alternating current to utilization means, a fourth winding on said core, rectifying means and current control means connected to said main winding and adapted to supply a controlled direct current to said fourth winding for stabilizing the frequency of said oscillating circuit.

2. A direct current to alternating current inverter as set forth in claim 1 wherein said rectifying means includes a rectifier bridge.

3. A direct current to alternating current inverter as set forth in claim 1 wherein said current control means includes a resistor.

4. A direct current to alternating current inverter as set forth in claim 1 wherein the current in said fourth winding is in a direction to counteract the tendency of said oscillating circuit to change frequency in response to changes in voltage of said direct current source.

References Cited by the Examiner
UNITED STATES PATENTS

| | | | |
|---|---|---|---|
| 2,848,614 | 8/1958 | Lyons | 331—113 |
| 2,854,580 | 9/1958 | Uchrin et al. | |
| 2,873,371 | 2/1959 | Van Allen. | |
| 3,031,629 | 4/1962 | Kadri | 331—113 |
| 3,133,256 | 5/1964 | Denelsbeck et al. | 331—113 |

ROY LAKE, *Primary Examiner.*
S. H. GRIMM, *Assistant Examiner.*